May 1, 1973  R. B. RICHARDS ET AL  3,730,796

BUILDING CONSTRUCTION AND METHOD OF MANUFACTURE

Filed June 4, 1970  4 Sheets-Sheet 1

United States Patent Office 3,730,796
Patented May 1, 1973

3,730,796
BUILDING CONSTRUCTION AND METHOD
OF MANUFACTURE
Reynald B. Richards, 27 Katoomba Road, 5066 Beaumont, South Australia, Australia, and William P. O'Brien, Kingston Park, and Peter Cannon, Glen Osmond, South Australia, Australia; said O'Brien and said Cannon assignors to said Richards
Filed June 4, 1970, Ser. No. 43,399
Int. Cl. B65h 81/08; E04b 1/32, 1/35
U.S. Cl. 156—173                      2 Claims

ABSTRACT OF THE DISCLOSURE

A method of forming portable housing structures in which a substantial rectangular former is produced on a collapsible rotatable mould to provide a shell which forms the floor and roof and walls of the structure in the nature of a tube, the shell comprising inner and outer layers of rigid materials such as fiberglass with an infill material therebetween having thermal insulating properties, and at least partly closing in the ends of the building structure so formed.

Figure 1:
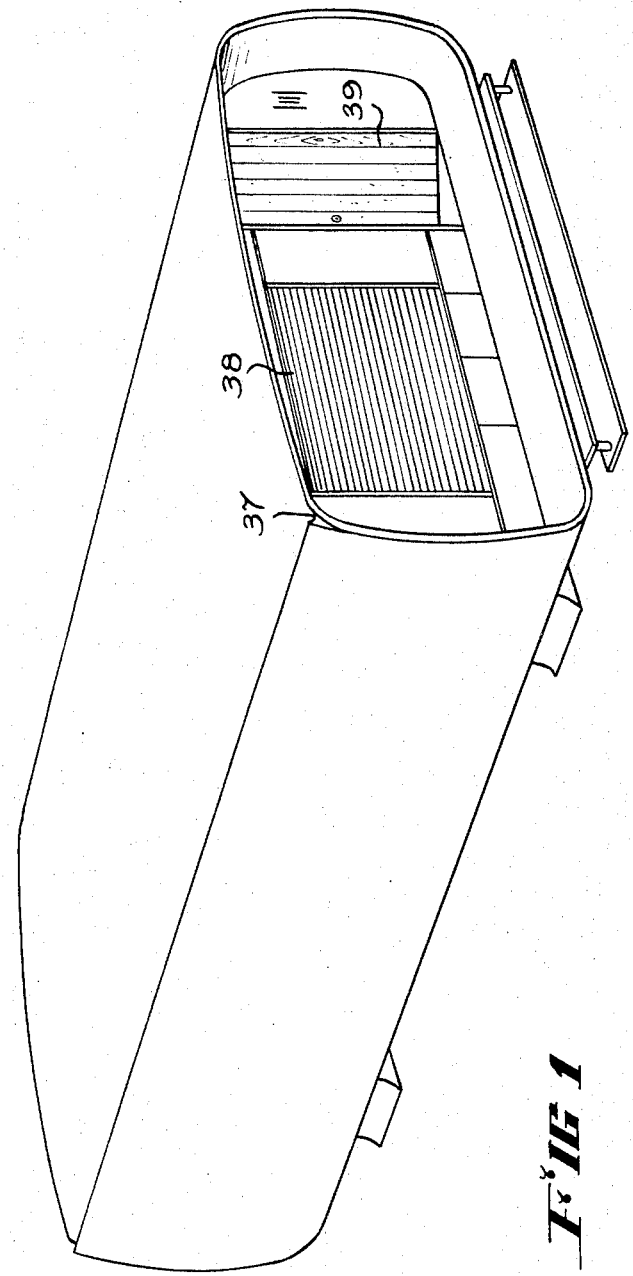

This invention relates to an improved building construction and a method of manufacturing same, and in particular it relates to a method in which the walling as well as the roof and floor of the housing structures are formed of a compound unit having the necessary sound and thermal insulation and faced with materials which are suitable as the inner and outer walling members.

It has already been proposed to build living quarters in which the outer walling is such that a self-supporting unit results into which walling can then be placed to divide the structure into rooms, windows being placed where required.

The principle of using a rigid outer structure is very suitable for portable housing in that it can be given the necessary rigidity and inherent strength to ensure that it can be factory produced and can then be readily transported to a site and simply erected, and can when necessary be moved to a new site should such be required.

The present invention has as its object the attainment of an improved housing structure and a suitable method of construction which will result in improved rigidity and will readily allow thermal and sound insulation to be attained and which will be relatively light so that a completed structure of the nature described is easily transportable.

Other objects of the invention will be apparent from the following description.

In its basic form the invention comprises a unitary structure or shell of somewhat tube-like shape which can either be formed as one piece or from a series of members joined together, so that the walls, roof and floor of the structure define a tube of generally rectangular cross-section.

Such a shell then is of basic rectangular construction but preferably has its walls and roof bowed slightly outwardly for greater strength and better appearance, the preferred method of constructing the shell being to first form an inner rigid layer, such as a fiberglass layer, on a former, then applying an infill material over the inner layer and then applying an outer rigid layer, such as a fiberglass layer, over the infill material to lock the structure together and provide the necessary rigidity due to the two spaced rigid layers with an infill material therebetween, the infill material being chosen to give the necessary thermal and acoustical insulation. Thus a sandwich is provided with two spaced stress-resisting layers between which is the insulating spacer material.

The infill material can be a winding of corrugated cardboard or similar cellular material, or it can comprise bats of a rigid or semi-rigid foam plastic, which infill material may be impregnated with preservatives to ensure that there can be no attack of same by insects or mould or the like.

In this way a former of selected generally rectangular shape may have produced on it a multiplicity of layers of the wall-forming material which as said can conveniently be a sandwich of two layers of fiberglass with an interposed infill material, thereby ensuring that the maximum strength results because internal stresses of the structure so formed are avoided due to the laminar construction, this ensuring that even at the bends the correct amount of material is used at each layer without having to stretch or compress the material, the bats if used being shaped to fit the bends by V slotting and bending after heating if this is necessary. Slots can also be cut to allow fiberglass to flow into same for strengthening purposes, or to provide rigid spacers between inner and outer layers.

A shell section so formed, together with end members, could be used as the complete structure but it would of course be possible to form more than one section and to subsequently join these together. Windows or the like could be formed or cut into the walls but generally it is preferred to form a simple tubular shell with one end closed and the other formed as a window with a door in it. The other end wall could conveniently include an air conditioning unit.

Figure 2:
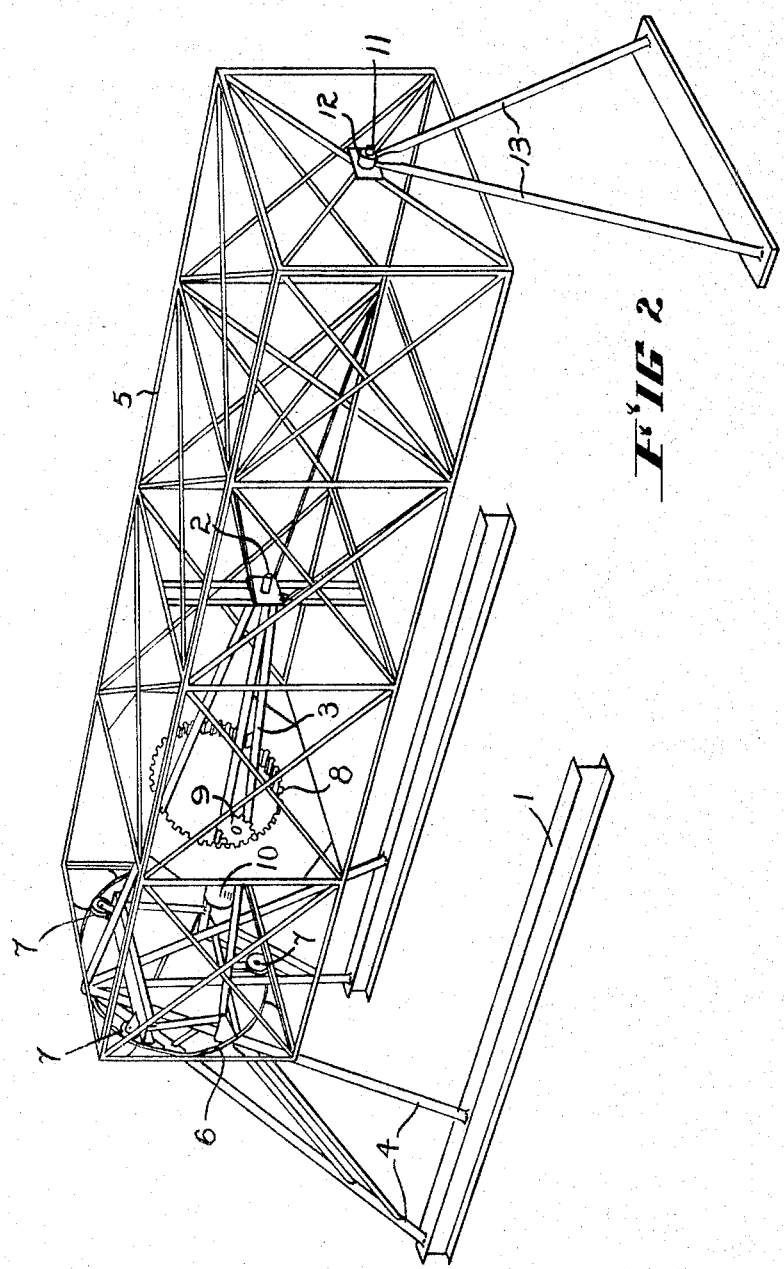
Figure 3:
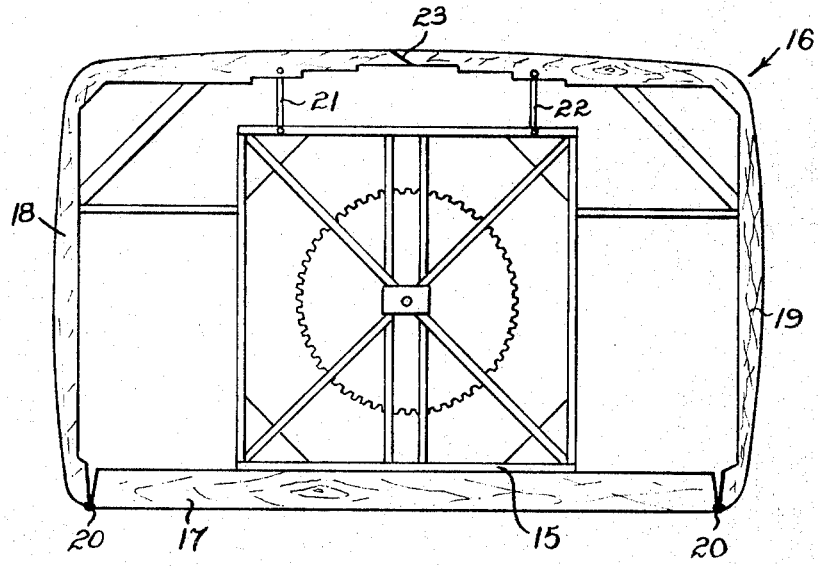
Figure 4:
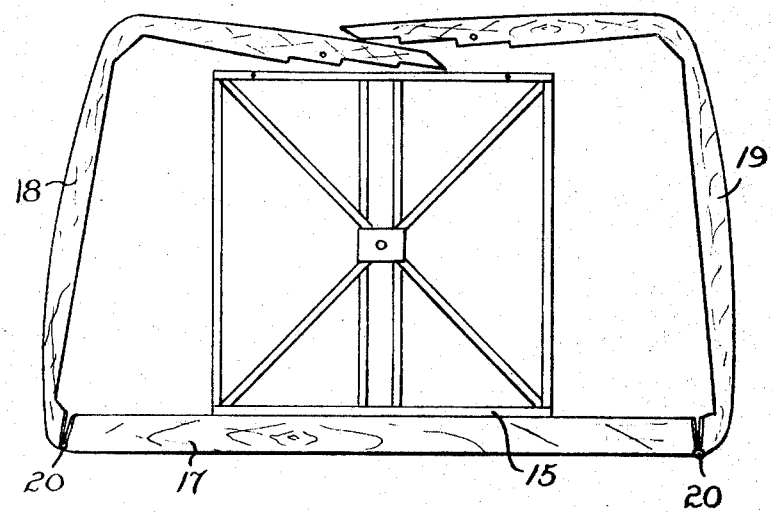
Figure 5:
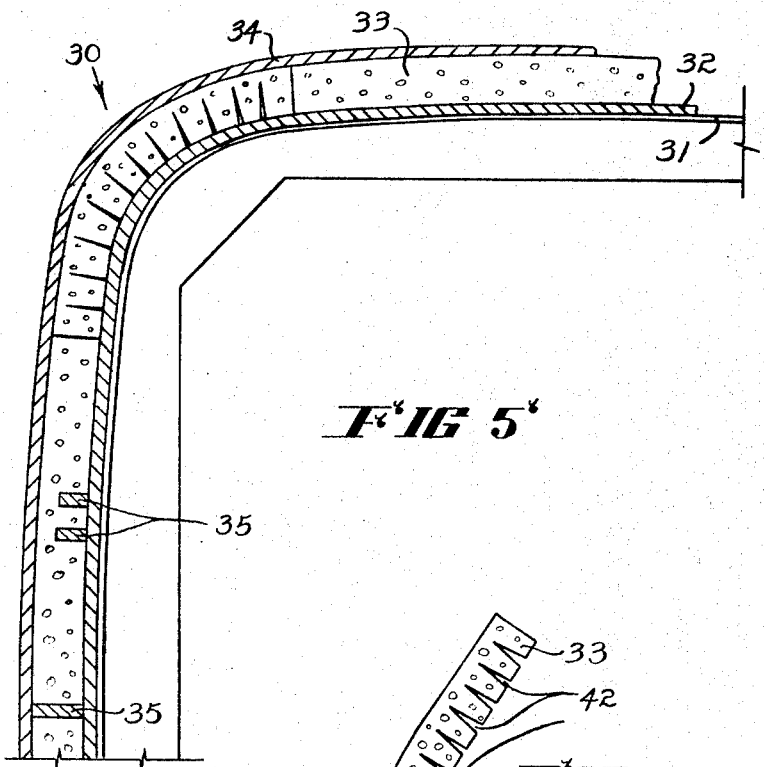
Figure 6:
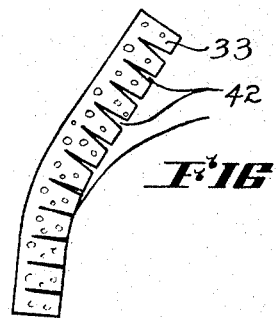
Figure 7:
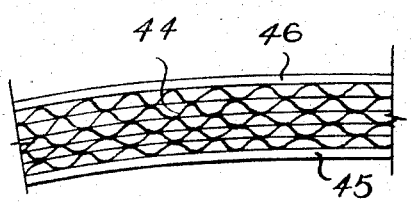
Figure 8:
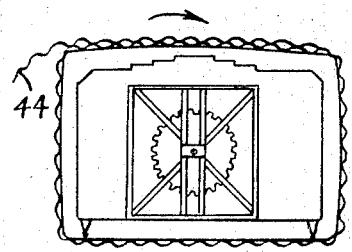

In order however that the invention may be more fully understood, embodiments thereof will now be described with reference to the accompanying drawings, in which:

FIG. 1 is a perspective view of a structure according to this invention,

FIG. 2 is a perspective view of the rotatable structure which carries the former but omitting the collapsible former itself, FIG. 3 is an end elevation of the former and its immediate support, FIG. 4 is a view similar to FIG. 3 but showing the former collapsed as when releasing a formed structure, FIG. 5 is a somewhat schematic fragmentary view showing a portion of the wall of the structure, using hard foam plastic bats, FIG. 6 is a view showing how the bats have V cuts made into them when they require to be bent, FIG. 7 is a fragmentary view of a structure wall using corrugated infill material, and FIG. 8 shows diagrammatically how corrugated infill material could be wound on layer by layer by rotating the former.

Referring first to FIGS. 1, 2, 3 and 4, a ground frame 1 supports an axle 2 through a triangulated sub-frame 3 and legs 4.

The axle 2 allows a rotatable frame 5 to be orientated on a horizontal axis the rotatable frame being stabilised by a ring 6 engaged by guide pulleys 7 supported from the legs 4 and triangulated sub-frame 3, orientation being controlled by a toothed ring 8 on the rotatable frame 5 which is engaged by a toothed wheel 9 connected through a reduction gear to a motor 10. In this way the rotatable frame can be orientated as required when forming a structure. An axle 11, co-axial with the axle 2, allows the outer end of the rotational frame 5 to be further supported by a bearing 12 and legs 13 if required.

Surrounding the rotatable frame, but attached thereto at 15 is a former 16 comprising a base 17 and a pair of retractable sections 18 and 19, the retractable sections 18 and 19 being connected along the side edges of the base 17 by hinges 20.

The retractable sections 18 and 19 are normally held in the expanded position shown in FIG. 3 by a pair of links 21 and 22 so that the former is held in a position where it is arranged to receive a shell-forming process on it, but when removal of the formed shell is required the retractable sections 18 and 19 can be drawn inwards to release the shell by first removing the link 21 to allow the section 18 to collapse inwards as shown in FIG. 4 due to the inclined longitudinal joint 23 between the sections, after which removal of the link 22 allows the section 19 to move down to finish as shown in FIG. 4. After removal of the bearing 12 and supporting legs 13 the shell manufactured in the former 16 can be withdrawn axially from the former.

The former 16 can have placed on to it windows, electrical wiring, plumbing or other fittings which are to be embedded or to form part of, or project through the shell when formed, but of course such components can be placed at the required location during the actual forming of the shell.

The process for forming the shell 30 may comprise treating the outside of the former 16 with a release coating 31 and then applying a layer 32 of fibreglass and resin thereto to form an inner layer and working the resin into the fibreglass by means of a segmented roller. Before the resin has set, the infill material 33 is laid on to the fibreglass inner layer 32 so formed and pressed thereto to build up a layer of perhaps 1½ to 2 inches thick completely around the fibreglass inner layer 32 to provide a core of infill material which will be relatively light yet of sufficient thickness so that when the stress-taking inner and outer fibreglass layers are present, a very rigid structure results, the structure having good thermal properties due to the air cells in the foam plastic or other infill material.

The next step then is to lay fibreglass matting or fabric over the infill material and to work the resin gell through the fibreglass with a segmented roller to form the outer fibreglass layer 34.

The roof can bow upwardly slightly, and as said the walls may be similarly shaped to bow outwards slightly, this giving enhanced strength and better appearance, but such a shape is not an essential and a completely rectangular structure could be provided within the spirit of the invention although it is preferred to curve the corners for greater rigidity.

To strengthen the fibreglass layers laterally, gaps 35 can be left between the bats of infill material 33, or notches formed therein into which the bonding resin can flow, such as shown in FIG. 5.

Corrugations can be formed at appropriate intervals on the roof which can serve as guttering to lead water to a drainpipe or the like so that it is possible to use the roof as a catchment area for water, or the guttering could be placed at the base of the sides of the structure if this was felt to be more desirable, such a gutter being indicated at 37 on one side of the structure shown in FIG. 1.

The internal walling of the structure can be varied to suit the size and type of room which is to be formed within it, provided it is to be used as a dwelling, and these can conveniently have the doors and windows formed therein so that the tubular member would then have windows 38 at one end only or at each end, although as stated earlier windows could also be formed in the sides or in the roof if such is thought desirable. A door 39 is shown.

The internal walling can again be formed of a similar material such for instance as infill material with a facing of fibreglass on each surface, although particularly for internal use material other than fiberglass may be quite suitable such as thin panel board or plywood. Any type of ornamental effect can be achieved by using suitable panels.

Plumbing and wiring can actually be built into the appropriate parts of the structure as the walling tube and components are formed, and the floor structure may include bearers which can be inserted between portions of the infill material at required points so as to properly distribute the load, these bearers being subsequently seated on a suitable foundation frame which can be of steel or concrete or blocks or the like.

The units can be arranged so that they can be placed one on another if required, or adjacent to each other, or in an end to end formation.

In FIG. 6 is shown how relatively rigid bats of the infill material 33 can be provided with V notches 42 at bends and the bats then bent, preferably after heating same, to follow the contour required.

The infill material 44 in FIG. 7 is corrugated cardboard or similar material, and this could be wound on to the former as indicated diagrammatically in FIG. 8, bonding and strengthening material such as resins being applied during such winding so that when the materials set the cardboard or the like will be sufficiently strengthened and bonded together to space the inner and outer layers of the structure.

The former would of course first have the fibreglass or other inner strengthening layer applied thereto, indicated by 45 in FIG. 7 and, after winding on the infill material, the outer layer 46 would be applied.

The infill material or core may be treated to make it vermin proof, and also it can have treatment to ensure that no moisture can be held in the material, and the bonding or strengthening resin can be chosen with this in mind.

It will be realised that because of the fibreglass sandwich construction the infill material is itself protected against the ingress of moisture or insect attack.

The method of carrying the invention into effect can be substantially varied but generally the steps can be as follows:

(1) Treat former with release agent.

(2) Apply gell coat. (This is not fundamental as an interior finish may be applied after removal from the former.)

(3) Lay inner skin of glass fibre one side at a time, rotating the former to bring each face successively uppermost so that it can be readily worked on.

(4) Work the resin gell coat through the fibreglass.

(5) Place bats of rigid foam plastic on to the fibreglass and press firmly into position to bond to the fibreglass, bending the corner bats by V grooving from the inner surface of the bat and after warming bending to shape around the corners.

(6) Wiring and plumbing are laid into the core, preferably against the inner skin or layer.

(7) Lay the outer layer of fiberglass in position over the bats and work the resin gell coat through the fiberglass. The gell coat can be applied over the bats to bond the bats together and the fibreglass then laid and the resin brought through the fibreglass by working the fibreglass inwards into the resin by use of a segmented roller or the like.

(8) The outer skin may be treated with a suitable exterior finish.

(9) The tubular shell so formed is supported from an overhead monorail or a trolley and the former is collapsed inwards and the shell drawn off it.

(10) The building is finished by fitting end panels, partitions and internal fittings.

(11) The building may then be transported to the site and supported on precast concrete blocks, metal frames or concrete foundations. These may be made sufficiently heavy to hold the building down or alternatively the building may be staked or otherwise tied to the ground. Screws of a similar type to those used for powerline anchors may be used.

With regard to the former itself the following particulars will be of interest.

(A) The former is shaped to include side walls and roof and preferably the floor also, the sections being hinged together or otherwise made to collapse.

(B) The former is mounted on bearings so that it can be rotated. This allows the fibreglass and infill material to be laid on a flat horizontal surface for all sides, roof and floor, and allows weights such as sand bags to be used to apply pressure at appropriate times if required.

(C) After the shell material has set, the former is collapsed so as to reduce its size, thus providing clearances to remove the completed shell with a trolley or gantry.

(D) Scaffolds may be arranged on either side of the former which can be moved in and out as the mould is rotated but give more access for the application of the various layers which form the tubular structure.

What we claim is:

1. The method of forming a portable housing shell structure which comprises:
   (a) supporting for rotation on a rotatable rectangular frame a rectangular former in part defined by a base engaging one side of the frame and completed by two retractable sections hinged respectively to the ends of the base, the sections having free ends meeting on the side of the frame opposite said one side thereof;
   (b) providing links between the frame and the free end portions of the sections normally to hold the sections extended but allowing the sections and therefore the former to collapse on to the frame upon removal of the links from holding position;
   (c) and, while rotating the frame, applying to the former an inner layer of fibrous material and bonding resin, then before the resin has set placing on said inner layer an infill material having thermal insulating properties, and then bonding to the outer surface of the infill material an outer layer of fibrous material, whereby a tubular shell of substantially rectangular cross-section is formed comprising inner and outer layers of fibrous material with an infill spacer of thermally insulating material therebetween;
   (d) at least partly closing in the ends of the tubular building structure so formed;
   (e) and moving the links from holding position to collapse the former sections inward from the shell so formed, and thereafter removing the shell from the former.

2. The method of claim 1 in which a release agent is applied to the former before applying the inner layer of fibrous material.

References Cited

UNITED STATES PATENTS

| | | | |
|---|---|---|---|
| 1,694,430 | 12/1928 | Root | 156—211 X |
| 2,415,240 | 2/1947 | Fouchy | 52—86 X |
| 2,933,056 | 4/1960 | Martin | 52—86 |
| 3,151,712 | 10/1964 | Jackson | 52—630 X |

OTHER REFERENCES

The New Building Block: A Report on the Factory-Produced Dwelling Module, Center for Housing & Environmental Studies, Cornell U., 1968, pp. 219–234.

Architectural Research on Structural Potential of Foam Plastics for Housing in Undeveloped Areas, Architectural Research Lab, U. of Mich., May 1966, pp. 7.17–7.32.

BENJAMIN A. BORCHELT, Primary Examiner

G. E. MONTONE, Assistant Examiner

U.S. Cl. X.R.

52—86, 630; 156—211